(12) United States Patent
Tsunoda et al.

(10) Patent No.: US 10,118,355 B2
(45) Date of Patent: Nov. 6, 2018

(54) TIRE MANUFACTURING METHOD

(71) Applicant: SUMITOMO RUBBER INDUSTRIES, LTD., Kobe-shi, Hyogo (JP)

(72) Inventors: Masaya Tsunoda, Kobe (JP); Kei Kohara, Kobe (JP); Takashi Tanaka, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 261 days.

(21) Appl. No.: 15/034,245

(22) PCT Filed: Aug. 26, 2014

(86) PCT No.: PCT/JP2014/072317
§ 371 (c)(1),
(2) Date: May 4, 2016

(87) PCT Pub. No.: WO2015/079757
PCT Pub. Date: Jun. 4, 2015

(65) Prior Publication Data
US 2016/0279888 A1    Sep. 29, 2016

(30) Foreign Application Priority Data

Nov. 27, 2013  (JP) ................. 2013-245257

(51) Int. Cl.
*B29D 30/12*   (2006.01)
*B29C 35/02*   (2006.01)
(Continued)

(52) U.S. Cl.
CPC ..... *B29D 30/0662* (2013.01); *B29D 30/0606* (2013.01); *B29D 30/0661* (2013.01);
(Continued)

(58) Field of Classification Search
CPC ............ B29D 30/0645; B29D 30/0661; B29D 30/12; B29D 2030/0646; B29D 2030/0674; B29D 2030/0675; B29D 2030/0677
See application file for complete search history.

(56) References Cited

U.S. PATENT DOCUMENTS 6,468,062 B1 * 10/2002 Soulalioux ............. B29D 30/12
425/50
2015/0037443 A1    2/2015 Kohara

FOREIGN PATENT DOCUMENTS

EP    0978370 A2    2/2000
EP    1468814 A2    10/2004
(Continued)

OTHER PUBLICATIONS

International Search Report, issued in PCT/JP2014/072317, PCT/ISA/210, dated Dec. 2, 2014.
(Continued)

*Primary Examiner* — Geoffrey L Knable
(74) *Attorney, Agent, or Firm* — Birch, Stewart, Kolasch & Birch, LLP

(57) ABSTRACT

The present invention increases tire formation precision and is a tire manufacturing method, which comprises a step S1 for forming a green tire on the outer surface of a rigid inner mold and a vulcanization step S2 for vulcanizing the green tire. The rigid inner mold comprises: an inner mold body, which is obtained from multiple segments; a core, which substantially binds the various segments; and an outer diameter adjusting means for changing the outer diameter of the core by changing the temperature of the core. Moreover. the rigid inner mold performs changes such that by expansion of the outer diameter of the core 5, the various segments move outward in the radial direction of the tire and gaps between the segments are enlarged, while by reducing the outer diameter of the core, the various segments move (Continued)

inward in the radial direction of the tire and the level differences R on the outer surface between adjacent segments increase. The vulcanization step S2 comprises an adjustment steps S21 for adjusting the outer diameter of the core using the outer diameter adjustment means so that the gaps G and the level differences R are within a previously established range.

6 Claims, 12 Drawing Sheets

(51) Int. Cl.
    *B29D 30/06*     (2006.01)
    *G01K 13/00*     (2006.01)
    *B29K 21/00*     (2006.01)
    *B29K 105/24*     (2006.01)
    *B29K 105/00*     (2006.01)

(52) U.S. Cl.
    CPC ............. *B29D 30/12* (2013.01); *G01K 13/00* (2013.01); *B29D 2030/0677* (2013.01); *B29K 2021/00* (2013.01); *B29K 2105/246* (2013.01); *B29K 2105/258* (2013.01)

(56) References Cited

FOREIGN PATENT DOCUMENTS

| | | | |
|---|---|---|---|
| EP | 2072234 A1 | | 6/2009 |
| JP | 11-320567 A | * | 11/1999 |
| JP | 2001-88143 A | | 4/2001 |
| JP | 2003-711741 A | | 11/2003 |
| JP | 2013-006366 A | * | 1/2013 |
| JP | 2013-6366 A | | 1/2013 |
| JP | 2013-6367 A | | 1/2013 |
| JP | 2013-6390 A | | 1/2013 |
| JP | 2013-193310 A | | 9/2013 |

OTHER PUBLICATIONS

Written Opinion of the International Searching Authority, issued in PCT/JP2014/072317, PCT/ISA/237, dated Dec. 2, 2014.
Extended European Search Report, dated Jul. 26, 2017, for European Application No. 14866344.6.

* cited by examiner

TIRE MANUFACTURING METHOD

TECHNICAL FIELD

The present invention relates to a method of manufacturing a tire enabling to increase accuracy of forming the tire.

BACKGROUND ART

In recent years, in order to prove the accuracy of forming a pneumatic tire, a tire manufacturing method using a rigid inner old is proposed. The manufacturing method of this kind, for example, comprises a step of forming a green tire and a vulcanization step of vulcanizing the green tire on the rigid inner mold on an outer surface of the rigid inner mold.

The rigid inner mold comprises an inner mold body and a core. The inner mold body comprises a plurality of segments. Upon the assembly of the segments, the inner mold body is formed in an annular shape having a central hole. Since the core is disposed in the central hole of the inner mold body, the respective segments are substantially constrained. Thus, the inner mold body may be held in the annular shape by the core.

The segments comprise first segments and second segments, and they are arranged alternately in the tire circumferential direction. Each of the first segments is provided at both ends in a tire circumferential direction with division surfaces inclined radially inward in a direction in which a circumferential length decreases. Each of the second segments is provided in the tire circumferential direction with division surfaces inclined radially inward in a direction in which a circumferential length increases. Such plurality of segments may be removed from an inner cavity of the tire by being moved radially inward of the tire sequentially from the second segments.

The first segments and the second segments are moved radially outward of the tire thereby increasing respective gaps between the first segments and the second segments. Further, since each of the first segments and each of the second segments are moved radially inward of the tire, the adjacent segments are in contact. Owing to such a contact between the adjacent segments, the first segment is pushed radially outward of the tire along an inclination of the division surface of the second segment, thereby increasing a level difference of the outer surface between the segments.
Patent Document 1: JP Patent Publication No. 2013-6367

DISCLOSURE OF THE INVENTION

Problems that the Invention is to Solve

In order to increase accuracy of forming the tire, in a vulcanization step, it is important to hold a state in which an outer surface of the rigid inner mold is smoothly continuous in the tire circumferential direction (i.e., the level difference of the outer surfaces between adjacent segments is small). However, due to a processing error of the core, segment or the like, when the adjacent segments are in contact during the vulcanization step, there is a problem that the outer surface of the rigid inner mold is not maintained in the above-descried good condition, and the accuracy of forming of the tire tends to decrease.

Further, in order to prevent of contact the adjacent segments, it is conceivable that a large gap is formed in advance between the adjacent segments. However, due to thermal expansion of the core during vulcanization, as each of the segments is pushed radially outward of the tire, the gap between adjacent segments is further increased. Such a large gap allows rubber of the inner surface of a green tire to penetrate thereinto, and there is a problem that a spew is easily formed on the inner surface of the tire.

The present invention has been devised in view of the circumstances described above, in order to fall the gap between adjacent segments and a level difference of the outer surfaces between the segments within respective predetermined ranges, as a basic that a diameter of the outside of the core is adjusted, it is a main object thereof is to provide a method of manufacturing the tire which capable of improving the accuracy of forming of the tire.

Means for Solving the Problems

The present invention is a tire manufacturing method for vulcanizing a green tire using a rigid inner mold comprising an outer surface for molding an inner cavity surface of a pneumatic tire. The method comprising: a step of forming the green tire on the outer surface of the rigid inner mold; a vulcanization step of vulcanizing the green tire on the rigid inner mold, wherein the rigid inner mold comprises an inner mold body comprising a plurality of segments forming an annular shape with a central hole upon being assembled, a core disposed in the central hole and substantially constraining the respective segments to hold the inner mold body in the annular shape. And an outer diameter adjusting means for changing an outer diameter of the core by changing a temperature of the core such that the respective segments move outward in a radial direction of the tire to increase a gap between adjacent segments by an expansion of the outer diameter of the core, and the respective segments move inward in the radial direction of the tire to increase a level difference of outer surfaces between adjacent segments by a reduction of the outer diameter of the core. The vulcanization step comprises an adjustment step of adjusting the outer diameter of the core by the outer diameter adjusting means so that the gap and the level difference fall within predetermined ranges.

In the tire manufacturing method according to the present invention, it is desirable that, prior to the adjustment step, the tire manufacturing method further comprises a preparation step of preliminarily obtaining a relationship between the temperature of the core and the gap or level difference, and that the adjustment step regulates the temperature of the core based on the relationship.

In the tire manufacturing method according to the present invention, it is desirable that the preparation step comprises a step of measuring the gap or level difference with respect to each temperature by changing the temperature of the core, and a step of determining an approximate expression indicating the relationship based on the gap or level difference measured with respect to each temperature.

In the tire manufacturing method according to the present invention, it is desirable that the preparation step comprises a step of defining a plurality of segment models on a computer in which the respective segments are discretized using a finite number of elements, a step of defining a core model on the computer in which the core is discretized using the finite number of elements, a step of calculating where the computer calculates the gap or level difference as a gap or level difference between segment models by changing a temperature of the core model, and a step of determining where the computer determines the approximate expression indicating the relationship based on a calculation result of the gap or level difference between segment models.

In the tire manufacturing method according to the present invention, the adjustment step, it is desirable that the adjustment step adjusts the gap in a range of more than 0 mm and not more than 0.04 mm.

Effect of the Invention

The tire manufacturing method according to the present invention comprises a step of forming a green tire on an outer surface of the rigid inner mold, and a vulcanization step of vulcanizing the green tire on the rigid inner mold.

The rigid inner mold is assembled to form an annular shape having a central hole. The rigid inner mold comprises: an inner mold body comprising a plurality of segments, a core disposed in the central hole and substantially constraining the respective segments to hold the inner mold body in the annular shape, and an outer diameter adjusting means for changing the outer diameter of the core by changing a temperature of the core.

The respective segments move outward in a radial direction of the tire to increase a gap between adjacent segments by an expansion of the outer diameter of the core. The respective segments move inward in the radial direction of the tire to increase a level difference of outer surfaces between adjacent segments by a reduction of the outer diameter of the core.

The vulcanization step according to the present invention comprises an adjustment step of adjusting the outer diameter of the core by the outer diameter adjusting means so that the gap and the level difference fall within predetermined ranges. Therefore, the manufacturing method of the present invention can suppress penetration of rubber of the green tire into the gap between adjacent segments, and it is possible to prevent forming spew of the tire is formed. Further, in the manufacturing method according to the present invention, the outer surface of the rigid inner mold is held in a smoothly continuous state in the tire circumferential direction, and the accuracy of forming the tire can be effectively improved.

DESCRIPTION OF THE REFERENCES

1 Rigid inner old
2 Vulcanization mold
3 Inner mold body
4 Segment
5 Core
33 Outer diameter adjusting means
G Gap between segments
R Level difference of outer surfaces of between segments

BEST MODE FOR CARRYING OUT THE INVENTION

Hereinafter, an embodiment of the present invention will be described with reference to the accompanying drawings.

Figure 1:
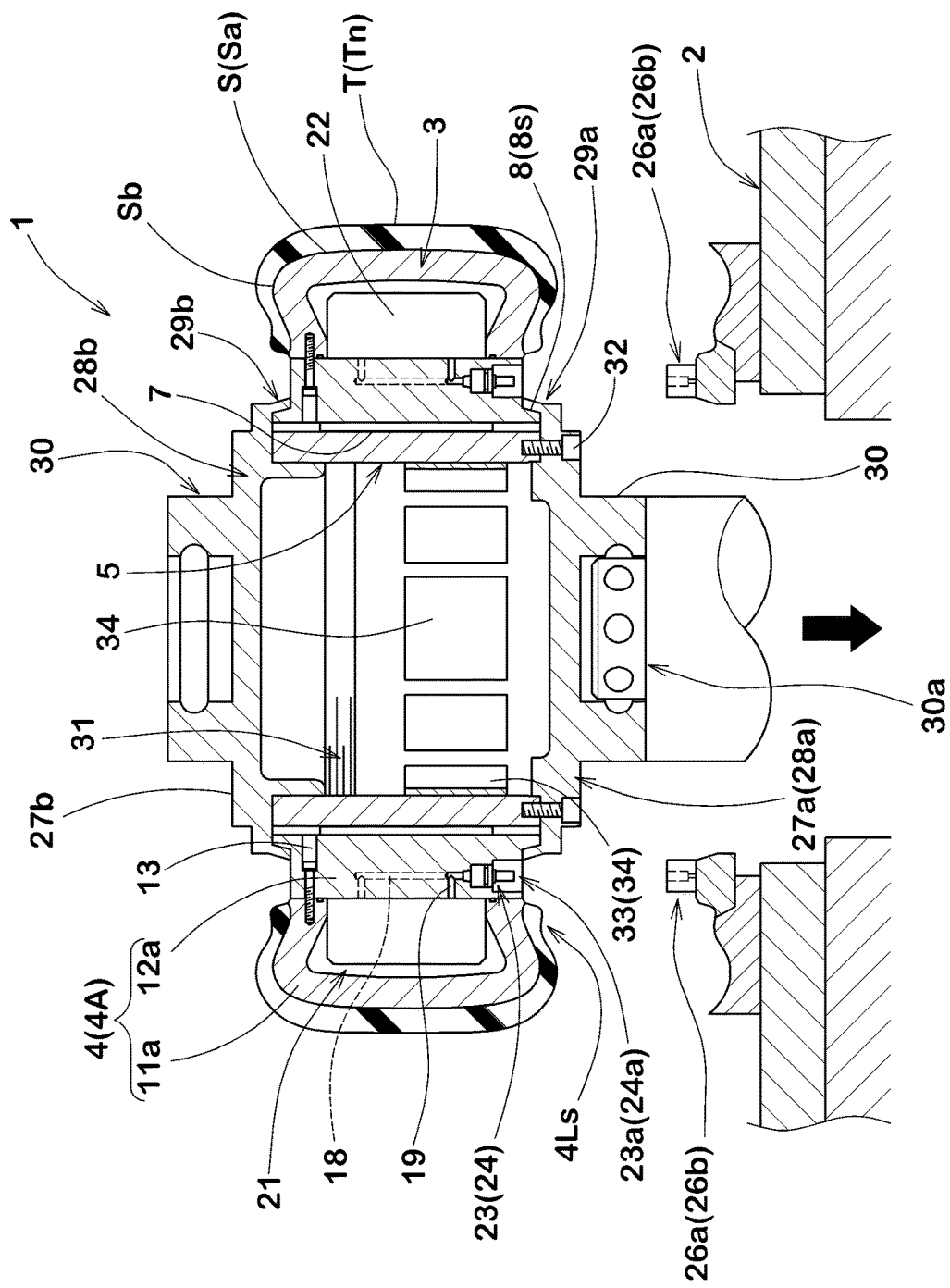
FIG. 1 is a cross-sectional view of a rigid inner mold used in a manufacturing method of the present embodiment.
Figure 2:
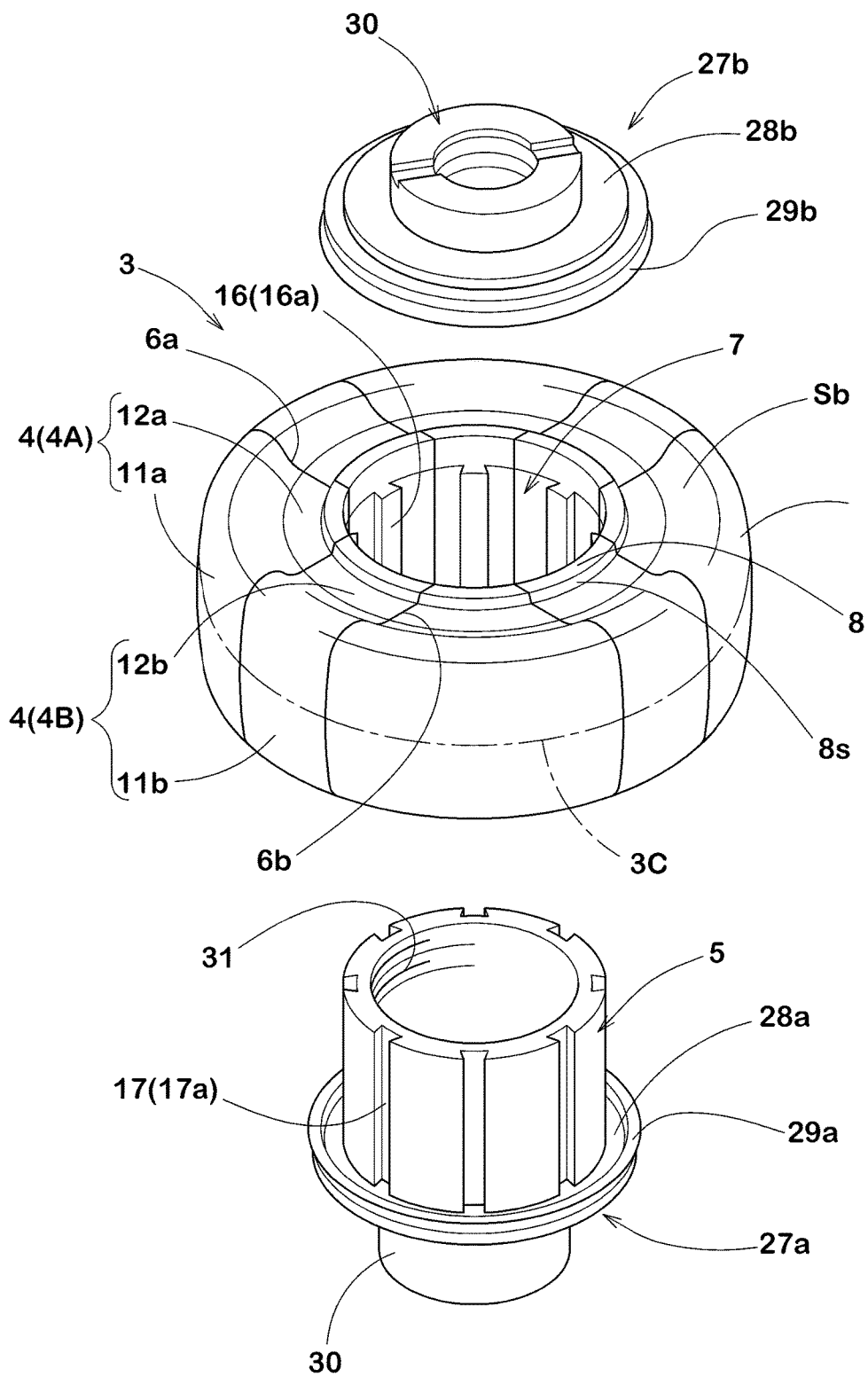
FIG. 2 is an exploded perspective view of a rigid inner mold.
Figure 3:
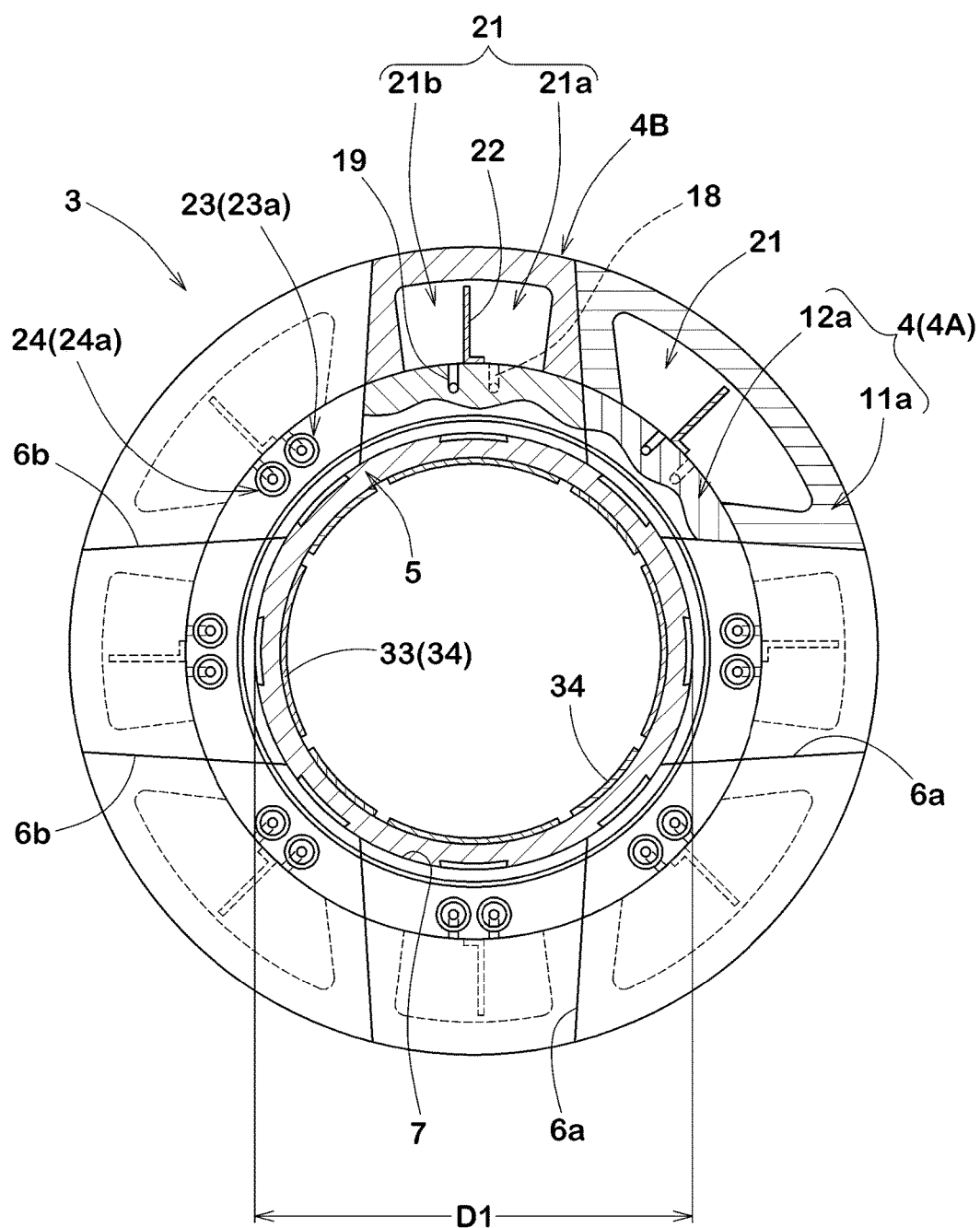
FIG. 3 is a bottom view of the inner mold body with a core as viewed from the axial direction.
Figure 4:
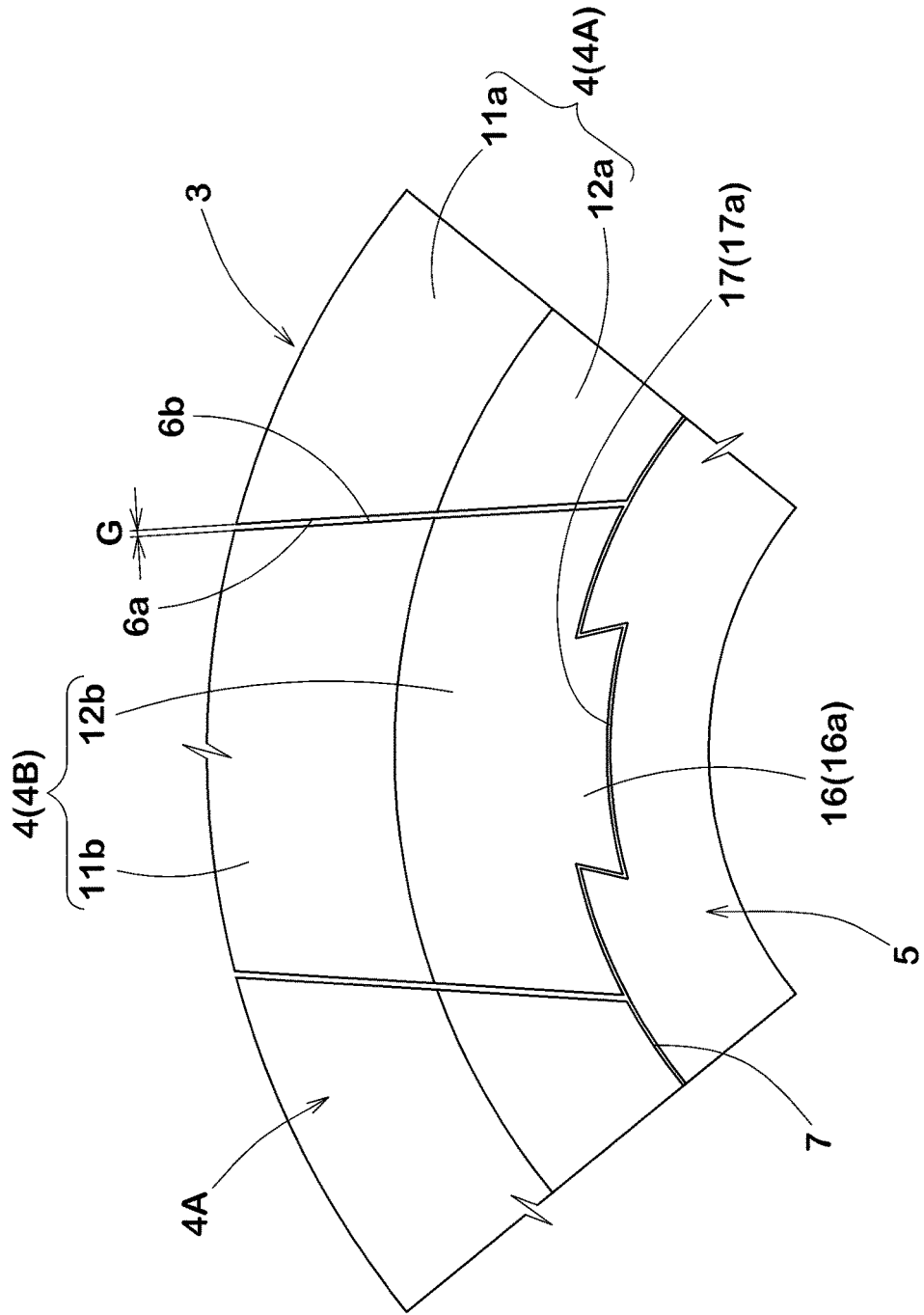
FIG. 4 is an enlarged view showing an engagement state between a first dovetail portion and a second dovetail portion.

FIG. 1 is a cross-sectional view of a rigid inner mold used in the manufacturing method of the present embodiment. FIG. 2 is an exploded perspective view of a rigid inner mold. FIG. 3 is a bottom view of the inner mold body with a core as viewed from the axial direction. FIG. 4 is an enlarged view showing an engagement state between a first dovetail portion and a second dovetail portion.

As shown in FIG. 1, a tire manufacturing method according to the present embodiment (hereinafter, simply referred to as "manufacturing method".) is a method for vulcanizing a green tire Tn by using a rigid inner mold 1 comprising an outer surface S for molding an inner cavity surface of a pneumatic tire (hereinafter, simply referred to as "tire") T, and a vulcanization mold 2 for forming the outer surface of the tire T.

As shown in FIG. 1 and FIG. 2, the outer surface S of the rigid inner mold 1 comprises, in the inner cavity surface of the tire T, a tread molding surface portion Sa forming an inner surface of the tread portion, and a side molding surface Sb comprising an inner surface of a sidewall portion and an inner surface of a bead portion. The outer surface S is substantially equal to an inner surface shape of a finished tire (vulcanized tire) T.

The rigid inner mold 1 according to this embodiment comprises an inner mold body 3 and a core 5.

The inner mold body 3 comprises a plurality of segments 4 divided in the tire circumferential direction and is formed separably. Further, upon the assembly of the segments 4, the inner mold body 3 forms an annular shape with a central hole 7. The inner mold body 3 comprises a bulging portion 8 bulging outward in the tire axial direction from the radially inner side of the outer surface S. The bulging portion 8 comprises a tapered surface 8s being continuous with the outer surface S and inclined outward in the tire axial direction toward the inward of the tire radial direction.

As shown in FIG. 2, the segment 4 comprises first segments 4A and second segments 4B. The first segments 4A and the second segments 4B are arranged alternately in the tire circumferential direction. As shown in FIG. 4, in the inner mold body 3 at ordinary temperatures before heating, a gap G (shown in FIG. 4) for thermal expansion is formed between division surfaces 6a and 6b at both ends in the circumferential direction of the segments 4A and 4B which are adjacent in the tire circumferential direction.

As shown in FIG. 2, in each of the first segments 4A, the division surfaces 6a and 6a at the both end in the circumferential direction inclines radially inward in a direction in which a circumferential length decreases. As shown in FIG. 4, each of the second segments 4B, the division surfaces 6b and 6b at the both end in the circumferential direction inclines radially inward in a direction in which a circumferential length increases. Thus, the inner mold body 3 is sequentially moved radially inward from the second segment 4B, and it is taken out from the inner cavity of the vulcanized tire T (shown in FIG. 1).

As shown in FIG. 2, the first segment 4A comprises an outer segment portion 11a disposed outward in the tire radial direction and an inner segment portion 12a disposed inward in the radial direction of the outer segment portion 11a. The outer segment portion 11a and the inner segment portion 12a are connected together by a bolt 13 (shown in FIG. 1) which is inserted from the radially inner surface of the inner segment portion 12a. Between the outer segment portion 11a and the inner segment portion 12a, a sealing (not shown) is provided.

The second segment 4B, as with the first segment 4A, comprises an outer segment portion 11b, and an inner segment portion 12b. The outer segment portion 11b and the inner segment portion 12b are integrally connected by a bolt 13 (shown in FIG. 1).

An inner surface of each of the segments 4A and 4B comprises a first dovetail portion 16 formed as a dovetail groove or a dovetail tenon extending continuously in the axial direction. The first dovetail portion 16 according to the present embodiment is formed as a dovetail tenon 16a. The first dovetail portion 16 is engaged with a second dovetail portion 17 formed on an outer peripheral surface of the core 5.

As shown in FIG. 1 and FIG. 3, each of the segments 4A and 4B of the present embodiment comprises interiorly an airtight chamber 21 where thermal fluid is filled. The chamber 21 is provided with a partition plate 22. Thus, the chamber 21 is partitioned into a first chamber portion 21a and a second chamber portion 21b.

Each of the segments 4A and 4B is provided on a side surface 4Ls (shown in FIG. 1) disposed on one side in the axial direction with a connection port 23a of an inner-mold-side connector 23, and a connection port 24a of an inner-mold-side connector 24. The connection port 23a communicates with the first chamber portion 21a via an intake passage 18. The connection port 24a communicates with the second chamber portion 21b via an exhaust-side passage 19. These connection ports 23a and 24a are connected with a mold-side connector 26a for thermal fluid supply or in a mold-side connector 26b of the thermal fluid discharge provided in the vulcanization mold 2 shown in FIG. 1. Incidentally, when the rigid inner mold 1 is inserted in the vulcanization mold 2, one side of the side surface 4Ls becomes a downside.

Into this inner mold body 3 in the vulcanization mold 2, the thermal fluid is supplied from the mold-side connector 26a, and the thermal fluid is discharged from the mold-side connector 26b so that the thermal fluid can be circulated in the chamber 21. Thus, the inner mold body 3 can effectively heat the green tire Tn.

As shown in FIG. 1 and FIG. 2, the core 5 is formed in a cylindrical shape. The core 5 is disposed in the central hole 7 of the inner mold body 3. As shown in FIG. 2, on the outer peripheral surface of the core 5, a second dovetail portion 17 to be engaged with the first dovetail portion 16 of the inner mold body 3 is provided. The second dovetail portion 17 is formed as a dovetail groove or dovetail tenon extending in the axial direction. The second dovetail portion 17 according to the present embodiment is formed as a dovetail groove 17a to be engaged with the dovetail tenon 16a of the first dovetail portion 16. Such dovetail tenon 16a and dovetail groove 17a, which fit together with each other, the inner mold body 3 and the core 5 are relatively movably coupled only in the axial direction.

At the end of axially one side of the core 5, a first side wall member 27a is fixed. The first side wall member 27a comprises a disc-shaped side plate portion 28a. The side plate portion 28a comprises a flange portion 29a abutting on the tapered surface 8s of the inner mold body 3. By abutting this flange portion 29a on the tapered surface 8s, the first side wall member 27a and the inner mold body 3 are aligned concentrically. The first side wall member 27a according to the present embodiment is fixed to the core 5 by a bolt 32 (shown in FIG. 1), but it may be fixed by welding or the like, for example. Such first side wall member 27a can prevent the respective segments 4A and 4B from shifting to one side in the axial direction.

At the end of axially other side of the core 5, a second side wall member 27b is fixed. The second side wall member 27b comprises a disc-shaped side plate portion 28b. The side plate portion 28b comprises a flange portion 29b abutting on the tapered surface 8s of the inner mold body 3. By abutting this flange portion 29b on the tapered surface 8s, the second side wall member 27b and the inner mold body 3 is aligned concentrically. The second side wall member 27b according to the present embodiment is detachably screwed with an internal thread portion 31 provided on the core 5. Such second side wall member 27b can prevent the respective segments 4A and 4B from shifting to other side in the axial direction.

Thus, in the core 5, the second dovetail portion 17 is engaged with the first dovetail portion 16 of the inner mold body 3, and, the first side wall member 27a and the second side wall member 27b are disposed at both axial ends of the core 5. Therefore the respective segments 4A and 4B are substantially constrained. Thus, the inner mold body 3 is held in the annular shape.

Each of the side plate portion 28a of the first side wall member 27a and the side plate portion 28b of the second side wall member 27b comprises a support shaft portion 30 protruding outwardly in the axial direction. The support shaft portion 30 is, for example, formed as a grip portion to be gripped by a conveying apparatus for conveying a rigid inner mold 1 or as an applied portion to apply the rigid inner mold 1, which is conveyed, to an apparatus such as the vulcanization mold 2. The support shaft portion 30 according to the present embodiment is detachably connected to a transfer device or the like via a connecting means 30a having a ball-lock mechanism, for example.

As shown in FIG. 1 and FIG. 3, the rigid inner mold 1 according to this embodiment comprises an outer diameter adjusting means 33 to change an outer diameter D1 (shown in FIG. 3) of the core 5 by changing the temperature of the core 5. The outer diameter adjusting means 33 of the present embodiment is formed by a heating means 34 to heat the core 5.

As the heating means 34, as long as it can change the temperature of the core 5, it is suitably employed. The heating means 34 of the present embodiment is formed as an electric heater, for example. The electric heater is formed into a sheet which is provided on the inner surface of the tire radial direction of the core 5.

As shown in FIG. 3, the heating means 34 according to this embodiment is arranged on an each inner region of the first segment 4A and the second segment 4B. To the heating means 34, electricity is supplied from a power source (not shown) provided in the vulcanization mold 2 via a power supply connector (not shown) provided at the first side wall member 27a. Thereby, the heating means 34 can heat the core 5. Further, in the present embodiment, a switch (not shown) which can be operated to supply the electricity to the heating means 34 and to stop the electricity supply is provided. Owing to this switch, an operator can appropriately switch between the heating of the core 5 and the stop of the heating of the core 5.

The heating means 34 can thermally expand the core 5 by increasing the temperature of the core 5. The thermal expansion of the core 5 makes the outer diameter D1 of the core 5 enlarged. On the other hand, the heating means 34 can thermally shrink the core 5 by stopping heating thereby lowering the temperature of the core 5. The thermal shrinkage of the core 5 makes the outer diameter D1 of the core 5 reduce. Such outer diameter adjusting means 33, since the outer diameter D1 of the core 5 is adjusted appropriately, it is possible to absorb the machining error of the segment 4.

The rigid inner mold 1 of this embodiment comprises a temperature sensor for measuring the temperature of the core 5 (not shown). This temperature sensor helps to arbitrarily set the temperature of the core 5.

Now, the manufacturing method according to this embodiment using such rigid inner mold 1 is described. In the production method according to the present embodiment, first, as shown in FIG. 1, a step S1 of forming a green tire Tn on the outer surface S of the rigid inner mold 1 is performed. In the step S1, on the outer surface S of the rigid inner mold 1, tire members such as an inner liner, a carcass ply, a belt ply, a sidewall rubber and/or a tread rubber are attached sequentially. Thus, on the outer surface of the rigid inner mold 1, the unvulcanized green tire Tn is formed.

Figure 5:
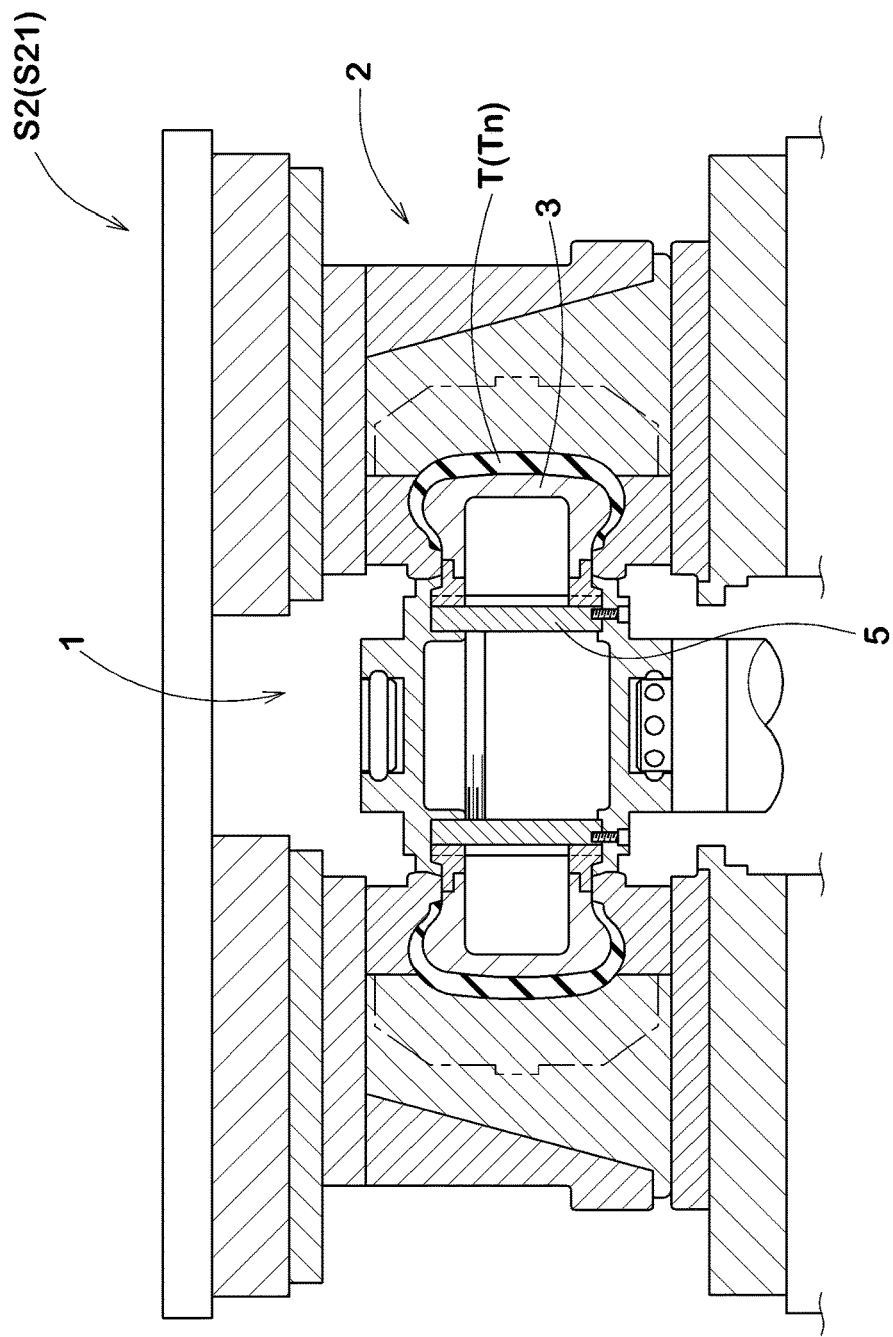
FIG. 5 is a cross-sectional view showing the rigid inner mold and a vulcanization mold during vulcanization.

Next, in the manufacturing method according to the present embodiment, a vulcanization step S2 to vulcanize the green tire Tn on the rigid inner mold 1 is carried out. FIG. 5 is a cross-sectional view showing the rigid inner mold 1 and the vulcanization mold 2 during vulcanization. In the vulcanization step S2, the green tire Tn is placed in a vulcanization mold 2 with the rigid inner mold 1, thus the green tire Tn is vulcanized in cooperation with the vulcanization mold 2. After the vulcanization, the tire T and the rigid inner mold 1 are removed from the vulcanization mold 2. By removing the rigid inner mold 1 from the inner cavity of the tire T, the tire T is manufactured.

Figure 6A:
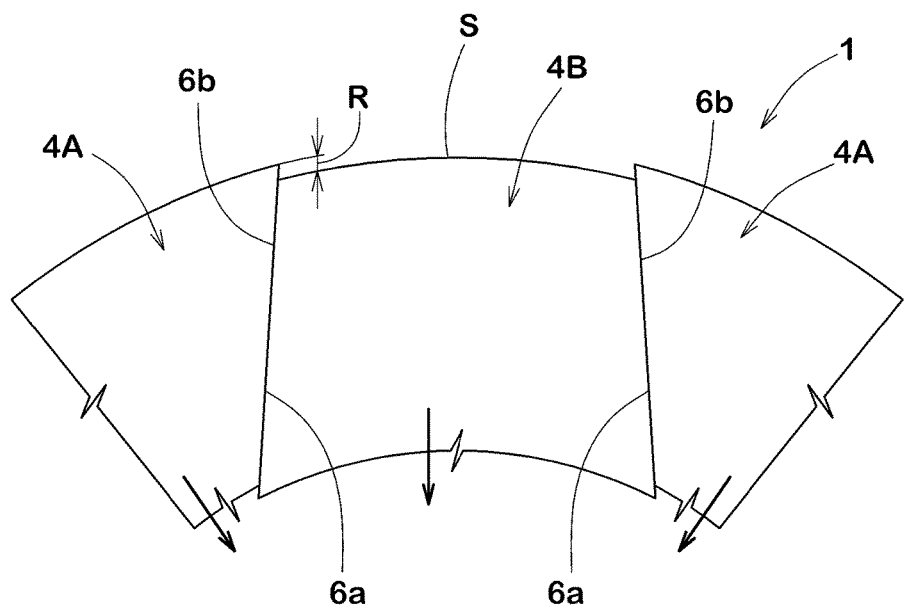
FIGS. 6(*a*) is an enlarged side view showing a level difference between the segments; and (*b*) is an enlarged side view showing a gap between the segments.
Figure 6B:
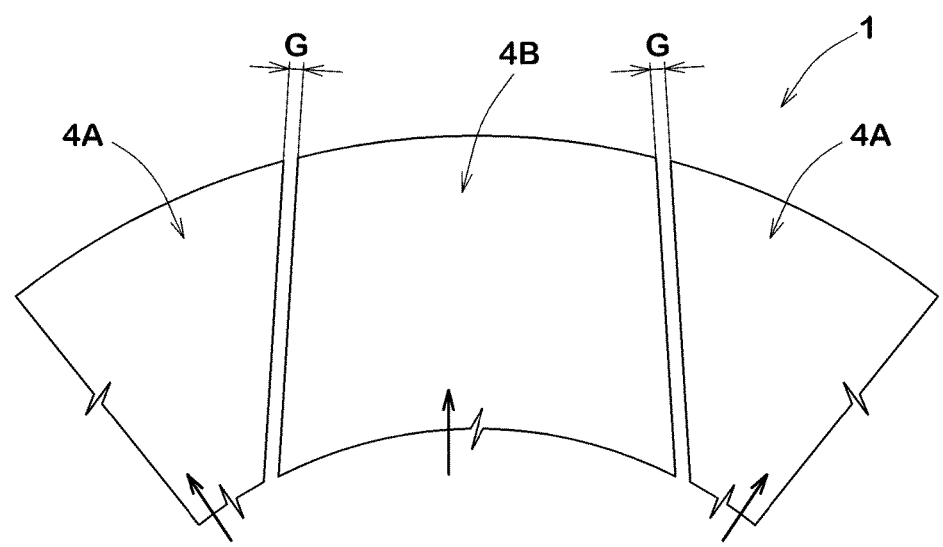

FIG. 6 are enlarged side views of the first segment 4A and the second segment 4B. As shown in FIG. 4, the division surfaces 6a and 6a of the first segment 4A are inclined radially inward in the direction in which the circumferential length decreases. Meanwhile, the division surfaces 6b and 6b of the second segment 4B are inclined radially inward in the direction in which the circumferential length increases. As shown in FIG. 6(a), since the first segment 4A and the second segment 4B are moved inward in the tire radial direction, the adjacent segments 4A and 4B are in contact. On the other hand, as shown in FIG. 6(b), since the first segment 4A and the second segment 4B are moved outward in the tire radial direction so that the gap G between the adjacent segments 4A and 4B increases.

As shown in FIG. 6(a), when the adjacent segments 4A and 4B are in contact, the first segment 4A is pushed outward in the tire radial direction along the inclination of the division surface 6b of the second segment 4B, and the level difference R of the outer surface S between the segments 4A and 4B is increased. For example, due to processing errors of the segment 4 and the core 5 or a shortage of thermal expansion (heating) of the core 5 in winter, there is a case that the adjacent segments 4A and 4B are in contact during the vulcanization step S2. In this way, when the adjacent segments 4A and 4B are in contact, a state where the outer surface S of the rigid inner mold 1 is continuous smoothly in the tire circumferential direction (i.e., a state where the level difference R of the outer surface S between the segments 4A and 4B is small (for example, not more than 0.04 mm)) is not maintained. Therefore, there is a problem that the accuracy of forming of the tire there tends to deteriorate.

Further, in order to prevent from contacting each other the adjacent segments 4A and 4B, it is conceivable that a large gap G between the segments 4A and 4B is provided in advance. However, as shown in FIG. 6(b), when the respective segments 4A and 4B are pushed outward in the tire radial direction by the thermal expansion of the core 5 during the vulcanization, the gap G between the segments 4A and 4B further grows. With regard to this large gap G, there is a problem that the rubber of the inner surface of the green tire Tn (shown in FIG. 1) penetrates into the gap G, and the spew is easily formed on the inner surface of the tire T (FIG. 1).

In the vulcanization step S2 according to the present embodiment, by the outer diameter adjusting means 33 (heating means 34), an adjustment step S21 to adjust the outer diameter D1 (shown in FIG. 3) of the core 5 is sequentially performed. As shown in FIG. 3, the heating means 34 of the present embodiment, as described above, by thermally expanding the core 5, the outer diameter D1 of the core 5 is enlarged. This expansion of the outer diameter D1 of the core 5 moves the respective segments 4A and 4B outward in the tire radial direction.

On the other hand, the heating means 34, by heat shrinking the core 5, the outer diameter D1 of the core 5 is reduced. The core 5 and each segment 4A and 4B, because they are connected via a first dovetail portion 16 and a second dovetail portion 17 shown in FIG. 4, by reduction of the outer diameter D1 of the core 5, the respective segments 4A and 4B move inward in the radial direction of the tire.

In the adjustment step S21 according to the present embodiment, by adjusting (changing) the outer diameter D1 of the core 5, the respective segments 4A and 4B are moved inward and outward in the tire radial direction. These movements of the segments 4A and 4B can adjust the gap between the segments 4A and 4B and the level difference R of the outer surface S between the segments 4A and 4B to fall within a predetermined range. Therefore, in the manufacturing method of the present invention, the penetration of the rubber of the green tire Tn into the gap G between the segments 4A and 4B can be prevented, thereby preventing from forming the spew on the tire T. Further, in the manufacturing method of the present invention, the state where the outer surface S of the rigid inner mold 1 is continuous smoothly in the tire circumferential direction is held, therefore it is possible to improve the accuracy of forming of the tire T effectively.

In the adjustment step S21, the gap (shown in FIG. 6(b)) between the segments 4A and 4B is preferably to be adjusted in a range between more than 0 mm and not more than 0.04 mm. Incidentally, if the gap G is more than 0.04 mm, the penetration of rubber of the green tire Tn is possibly prevented insufficiently. To the contrary, if the gap G is not more than 0 mm below, the adjacent segments 4A and 4B are in contact, and the state in which the outer surface S of the rigid inner mold 1 is continuous smoothly in the circumferential direction of the tire is possibly not held sufficiently.

Similarly, in the adjustment step S21, the level difference R (shown in FIG. 6 (a)) of the outer surface S between the segment 4A and 4B is preferably adjusted not more than 0.08 mm, more preferably not more than 0.04 mm. In the present description, the gap G between the segments 4A and 4B and the level difference R of the outer surface S between the segments 4A and 4B are measured on the equator 3c (shown in FIG. 2) of the inner mold body 3.

The core 5 is affected by the heat or the like from the segment 4, and the temperature and the outer diameter D1 of the core 5 changes every moment. Therefore, the adjustment step S21 is preferably sequentially carried out while the vulcanization step S2 is carried out. Thus, in the vulcanization step S2, the gap G (shown in FIG. 6(b)) between the segments 4A and 4B and the level difference R (shown in FIG. 6(a)) of the outer surface S between the segments 4A and 4B are maintained in preferable ranges. Therefore, it is possible to improve the accuracy of forming of the tire T (FIG. 1) effectively. An interval of performing the adjustment step S21 is preferably 1 to 5 seconds in consideration of velocity of thermal conduction of the core 5.

The outer diameter D1 (temperature) of the core 5 can be successively adjusted on the basis of measurement results of the gap G (shown in FIG. 6(b)) between the segments 4A and 4B and the level difference R (shown in FIG. 6(a)) of the outer surface S between the segments 4A and 4B, for example. For the measurements of the gap G and the level difference R, for example, a laser displacement meter (not shown) provided in the rigid inner mold 1 is used.

Figure 7:
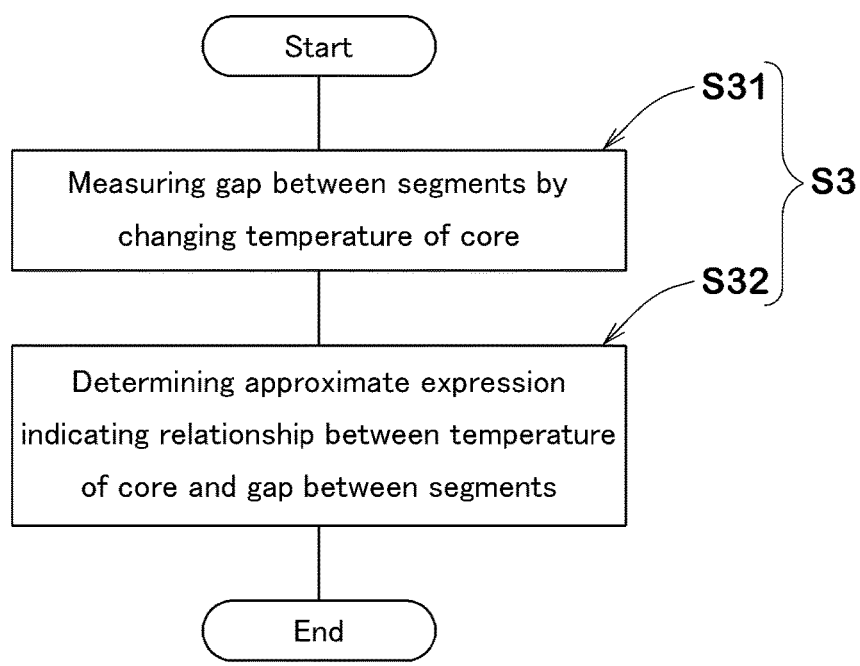
FIG. 7 is a flowchart illustrating an example of processing procedures in a preparation step of the present embodiment.

The outer diameter D1 of the core 5 may be sequentially adjusted based on a preliminarily obtained relationship between the temperature of the core 5 and the gap G (shown in FIG. 6(b)) prior to the adjustment step S21 (Preparation Step S3). FIG. 7 is a flowchart illustrating an example of the processing procedure of the preparation step S3 according to the present embodiment.

In the preparing process S3 of the present embodiment, first, the gap G between the segments 4A and 4B are measured with respect to each temperature by changing the temperature of the core 5 (shown in FIG. 1) (step S31). In the step S31, first, the core 5 is heated by the heating means 34. Then, at a predetermined temperature interval, the gap G between the segments 4A and 4B is measured. The gap G can be easily measured by use of a laser displacement meter attached to the rigid inner mold 1 (not shown), for example.

In the step S31, prior to the measurement of the gap G, it is preferable that the thermal fluid is filled into the chamber 21 (shown in FIG. 3) and that the respective segments 4A and 4B are heated. Thus, the gap G (shown in FIG. 6(b)) between segments 4A and 4B can be accurately measured since influence due to the thermal expansion of the respective segments 4A and 4B during the vulcanization is included.

Figure 8:
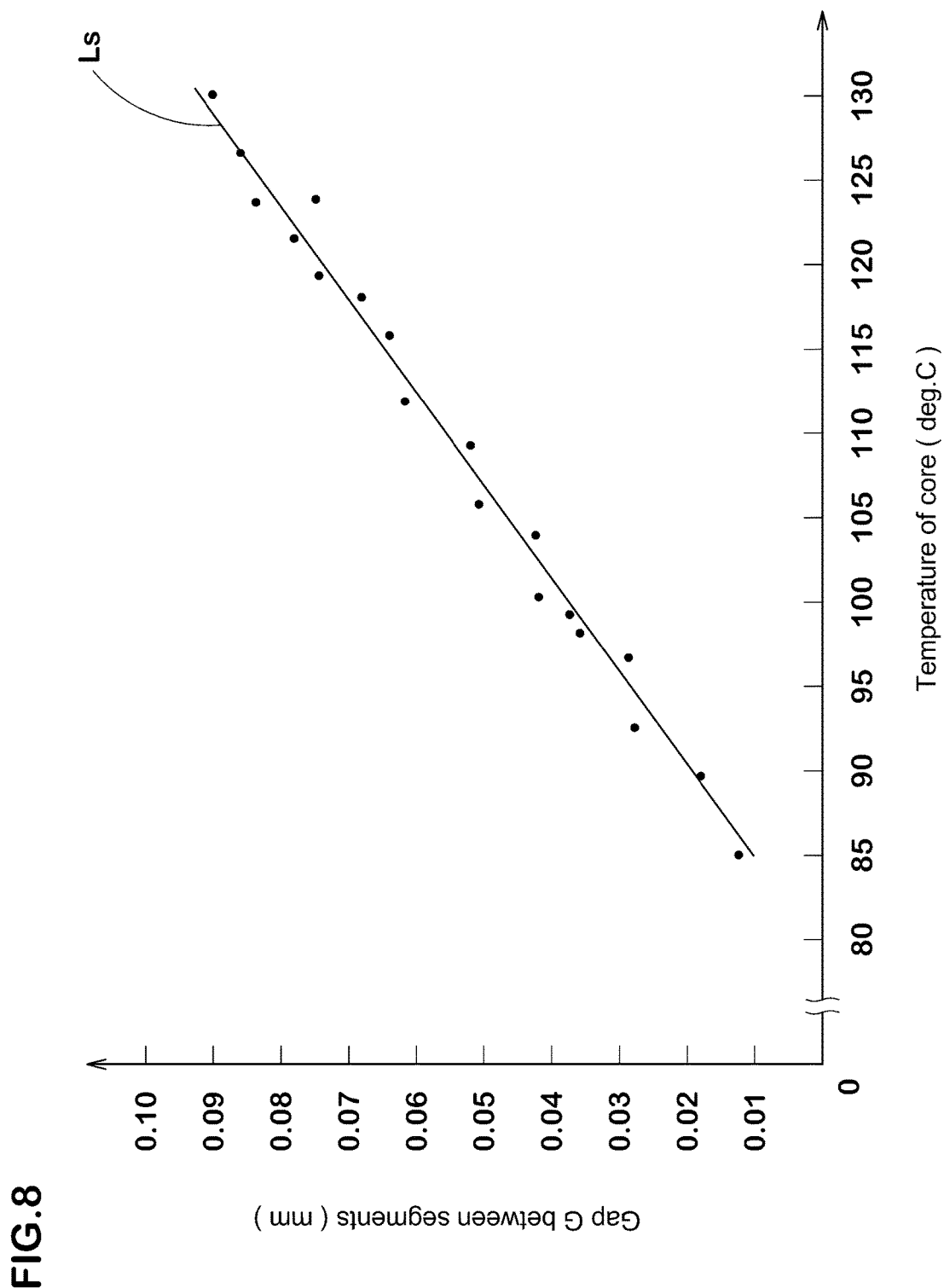
FIG. 8 is a graph showing a relationship between a temperature of the core and the gap.

Next, in the preparation step S3, on the basis of the gap G between the segments 4A and 4B measured for each temperature of the core 5, an approximate expression indicating the relationship between the temperature of the core 5 and the gap G is determined (step S32). FIG. 8 is a graph showing the relationship between the temperature of the core 5 and the gap G. In the step S32, from the gap G measured for each temperature, for example, an approximate straight line Ls is determined based on least-square method. Owing to this approximation straight line Ls, the temperature of the core 5 corresponding to the preferred gap G can readily be determined.

Then, in the adjustment step S21 according to the present embodiment, first, based on the approximate straight line Ls, a range of the temperature of the core 5 where the gap G is preferably settable within the preferred range described above is obtained. Then, by being properly carried out the heating of the core 5 or the stopping the heating of the core 5, the temperature of the core 5 is maintained in the range of the determined temperature. Accordingly, in the adjustment step S21, the outer diameter D1 of the core 5 is adjusted, and the gap G between the segments 4A and 4B can be maintained in the above preferable range. Therefore, in the vulcanization step S2, it is possible to prevent the spew formed on the tire T.

When the gap G between the segments 4A and 4B is maintained in the above-mentioned preferred range, the contact of the adjacent segments 4A and 4B is suppressed. Accordingly, the level difference R (shown in FIG. 6(a)) of the outer surface S between the segments 4A and 4B caused by the contact of the segments 4A and 4B can be suppressed. Therefore, in the present embodiment, as described above, since the temperature of the core 5 (i.e., the outer diameter D1 of the core 5) is adjusted based only on the relation between the temperature of the core 5 and the gap G, both of the gap G between the segments 4A and 4B and the level difference R of the outer surface S between the segments 4A and 4B are maintained in the above-mentioned preferred ranges. Therefore, the manufacturing method of this embodiment, while preventing the spew formed in the tire T, the accuracy of forming of the tire can be effectively improved.

In adjustment step S21 according to the present embodiment, since the temperature of the core 5 (the outer diameter D1 of the core 5) is adjusted based on the approximate straight line Ls, for example, there is no need to sequentially measure the gap (shown in FIG. 6(b)) between the segments 4A and 4B and the level difference R (shown in FIG. 6(a)) of the outer surface S between the segments 4A and 4B during the vulcanization step S2 by a laser displacement meter (not shown) or the like. Therefore, in the manufacturing method of this embodiment, an improvement of work efficiency in the adjustment step S21 and a simplification of the structure of the rigid inner mold 1 may be achieved.

In preparing step S3, for the range of temperature of the core 5 where the gap G between the segments 4A and 4B is measured may he set as appropriate. The range of temperature of the core 5 of the present embodiment, for example, is preferably set to from 85 to 180 deg. C. Further, in order to obtain accurately the relationship between the temperature of the core 5 and the gap G, the temperature interval in which the gap G is measured, is preferably set to from 1 to 2 deg. C.

The preparing process S3 according to the present embodiment shows an embodiment that the gap G between the segments 4A and 4B is actually measured by actually changing the temperature of the core 5, but is not limited thereto. For example, the gap G may be calculated using a computer.

Figure 9:
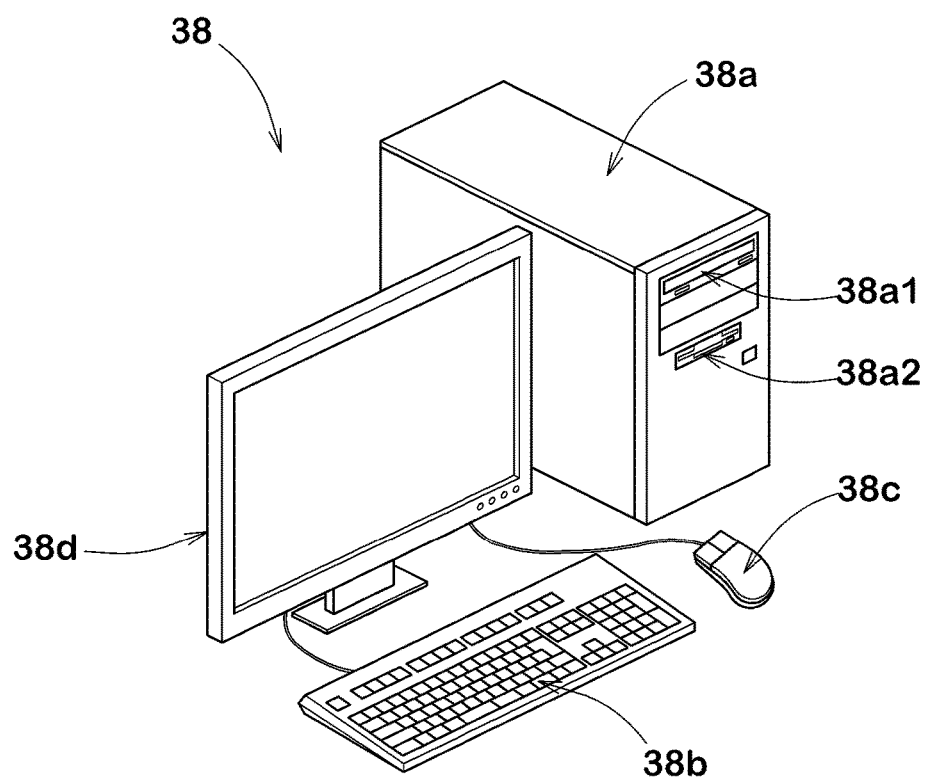
FIG. 9 is a perspective view of a computer for executing a preparation step of another embodiment of the present invention.

FIG. 9 is a perspective view of a computer for executing a preparation step S3 of another embodiment of the present invention. The computer 38 comprises a main body 38a, a keyboard 38b, a mouse 38c and a display device 38d. This main body 38a comprises an arithmetic processing unit (CPU), ROM, working memory, a storage device such as a magnetic disk and a disk drive device 38a1 and 38a2 such as a magnetic disk. Note that in the storage device, processing procedures (program) for performing the preparation step S3 of the present embodiment are stored in advance.

Figure 10:
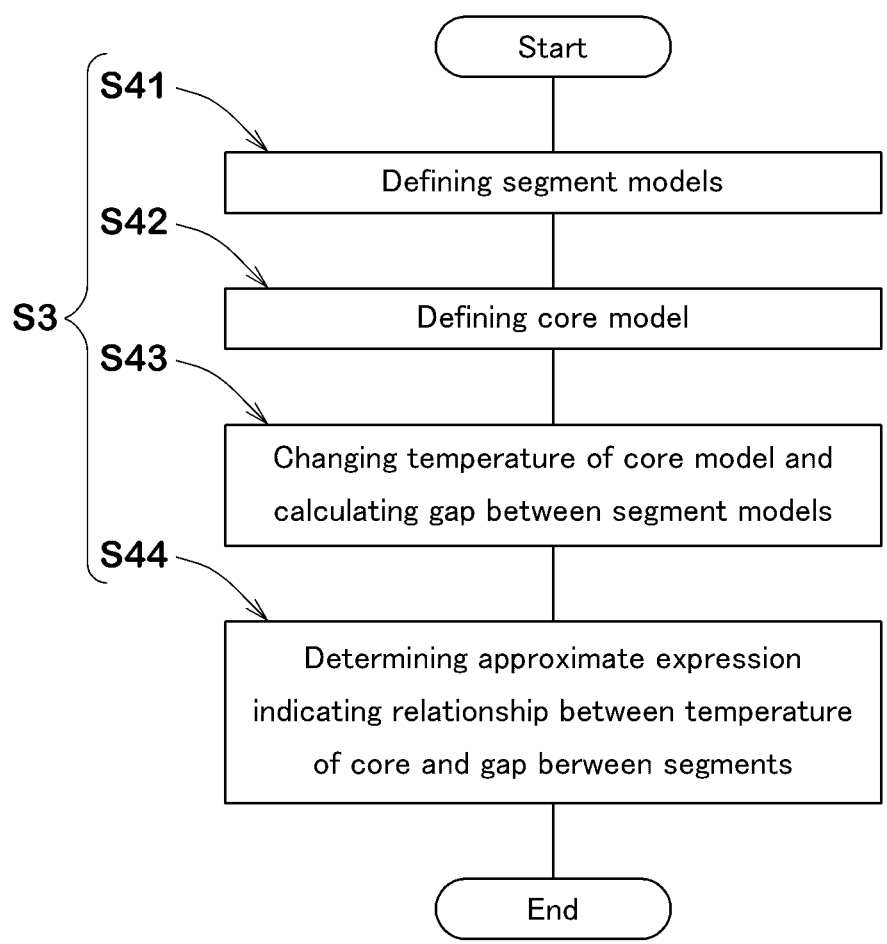
FIG. 10 is a flowchart illustrating an example of the processing procedures of the preparation step of another embodiment of the present invention.
Figure 11:
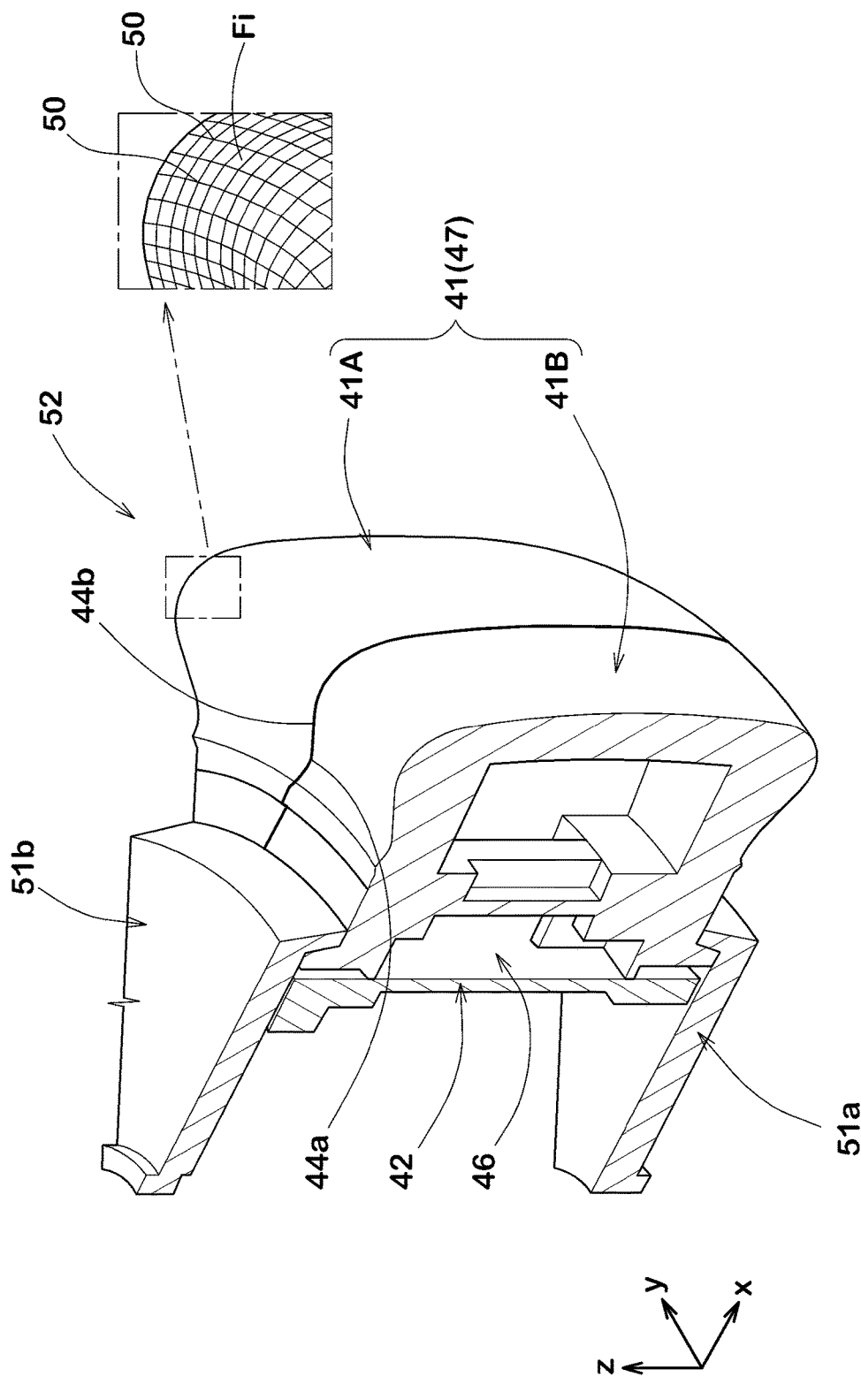
FIG. 11 is a conceptual diagram showing a part of segment model and a core model.

FIG. 10 is a flowchart illustrating an example of the processing procedure of the preparation step S3 of another embodiment of the present invention. In the preparation step S3 of this embodiment, first, a plurality of segment models in which respective segments are discretized using a finite number of elements are defined on a computer 38 (step S41). FIG. 11 is a conceptual diagram showing a part of the segment models 41 and a core model 42.

Each of the segment models 41 is set by being modeled (discretized) by a finite number of elements Fi (i=1, 2, . . . ) which are available in numerical analytical approach. Setting of this model can be easily performed by meshing and using software.

In the step S41, the first segment 4A and the second segment 4B shown in FIG. 2 are modeled with the elements Fi. Thus, in the step S41, the first segment model 41A and a second segment model 41B are set. Further, at both circumferential ends of a first segment model 41A, division surfaces 44a and 44a are respectively formed. Further, in the tire circumferential direction at circumferential ends of the second segment model 41B, division surfaces 44b and 44b are formed. Then, in the step S41, the first segment model 41A and the second segment model 41B have been lined alternately in the tire circumferential direction and arranged in a circular ring. Thus, inner mold body model 47 having a central hole 46 is set.

As the numerical methods, for example, the finite element method, the finite volume method, the method of finite difference, and the boundary element method can be appropriately employed. In the present embodiment, the finite element method is employed. As the respective elements Fi, for example, a hexahedral element or a tetrahedral element is preferably used but is not limited thereto. In addition, each of the elements Fi comprises a plurality of nodes 50. In this element Fi, numeric data such as an element number, a node number, a node coordinate value and material features (elastic modulus. Poisson's ratio, the friction coefficient, and coefficient of linear expansion, etc.) are defined. The numerical data is stored in the computer 38.

Next, in the preparation step S3, the core model 42 in which the core is discretized using the finite number of elements is defined on a computer 38 (step S42). The core model 42 is set by being modeled (discretized) by a finite number of elements Fi (i=1, 2, . . . ) as well as the segment model 41.

Further, in the step S42, the first side wall member 27a and the second side wall member 27b shown in FIG. 2 are also discretized by a finite number of elements Fi (i=1, 2, . . . ). As a result, one of the side wall body model 51a and the other side wall body model 51b are set.

In addition, in step S42, the central hole 46 of the inner mold body model 47, the core model 42 is placed. Further, in step S42, the both end portions in the axial direction of the core 5, the one side wall body model 51a and the other side tall body model 51b is disposed. Accordingly, the segment model 41, a core model 42, the one side wall body model 51a, and the rigid core model 52 including the other side wall body model 51b is set.

Next, in the preparation step S3, the computer 38 changes temperatures of the core model 42 and calculates a gap (not shown) between the segment models 41A and 41B (step S43). A gap between the segment models 41A and 41B is treated as a gap G (shown in FIG. 6(b)) between the segments 4A and 4B.

In the step S43, first, based on the temperature of the thermal fluid to be filled into the chamber 21 (shown in FIG. 3), a temperature of the segment model 41 is set. Next, a plurality of temperatures is set to the core model 42. Then, based on the coefficient of linear expansion set to the element Fi, the thermally expanded segment model 41 and core model 42 are calculated.

For this deformation calculation due to the thermal expansion, for example, a commercially available finite element analysis application software such LS-DYNA manufactured by JSOL is used. Then, each time of the temperature set in the core model 42, the thermally expanded segment model 41 and core model 42 are calculated, and the gap between the segment models 41A and 41B (not shown) is calculated. The calculated gap between the segment models 41A and 41B is stored in the computer 38 for each temperature.

When the friction coefficient set between respective models is large, deformation calculation due to the thermal expansion may become difficult to stably. Therefore, the friction coefficient set to between respective models is preferably smaller, preferably not more than 0.1, more preferably 0 (without friction). Incidentally, in the preparation step S3 of this embodiment, it is important to determine the relationship between the temperature of the core 5 and the gap G between the segments 4A and 4B. Therefore, it gives no particular problem even some errors in the gap G is generated by setting a small value as the friction coefficient between the models.

Next, in the preparation step S3, the computer 38 determines the approximate expression indicating the relationship between the temperature of the core 5 and the gap G between the segment models 4A and 4B (shown in FIG. 6(b)) based on the calculation result of the gap (not shown) between segment models 41A and 41B (step S44). In the step S44, from the gap between the segment models 41A and 41B calculated for each temperature of the core model 42, for example, based on the least-square method, an approximate straight line Ls (shown in FIG. 8) is obtained, owing to this approximation straight line Ls, the temperature of the core 5 corresponding to the gap G in the preferred range is easily obtained.

Thus, in the preparation step S3 according to this embodiment, similarly to the preparation step S3 of the previous embodiment, the approximate straight line Ls expressing the relationship between the temperature of the core 5 and the gap G (shown in FIG. 6(b)) between the segments 4A and 4B is obtained. Therefore, in the vulcanization step S2, while the gap G between the adjacent segments 4A and 4B and the level difference R (shown in FIG. 6(a)) of the outer surface S between the segments 4A and 4B are maintained in the above preferable ranges, the green tire Tn may be vulcanized. Accordingly, the manufacturing method of this embodiment, while preventing the spew from being formed in the tire T, the accuracy of forming the tire T can be effectively improved.

Further, in the preparation step S3 according to this embodiment, without actually using the segments 4A and 4B and the core 5, an approximate expression indicating the relationship between the temperature of the core 5 and the gap G is obtained. Therefore, in this embodiment, since the relationship between the temperature of the core 5 and the gap G is obtained from a design stage of the rigid inner mold 1, the rigid inner mold 1 (shown in FIG. 1) capable of improving the accuracy of forming the tire T may be designed.

In the previous embodiments described above, in the preparation step S3, only the relationship between the temperature of the core 5 and the gap G between the segments 4A and 4B was obtained, but is not limited thereto. For example, a relationship between the temperature of the core 5 and the level difference R (shown in FIG. 6(a)) of the outer surface S between the segments 4A and 4B may be acquired.

Incidentally, the level difference R may be actually measured or may be calculated in the simulation using the computer 38. Based on this relationship, by the temperature of the core 5 is adjusted, the level difference R of the outer surface S between the segments 4A and 4B and the gap G between the adjacent segments 4A and 4B may be maintained within the above-mentioned preferable ranges.

Figure 12:
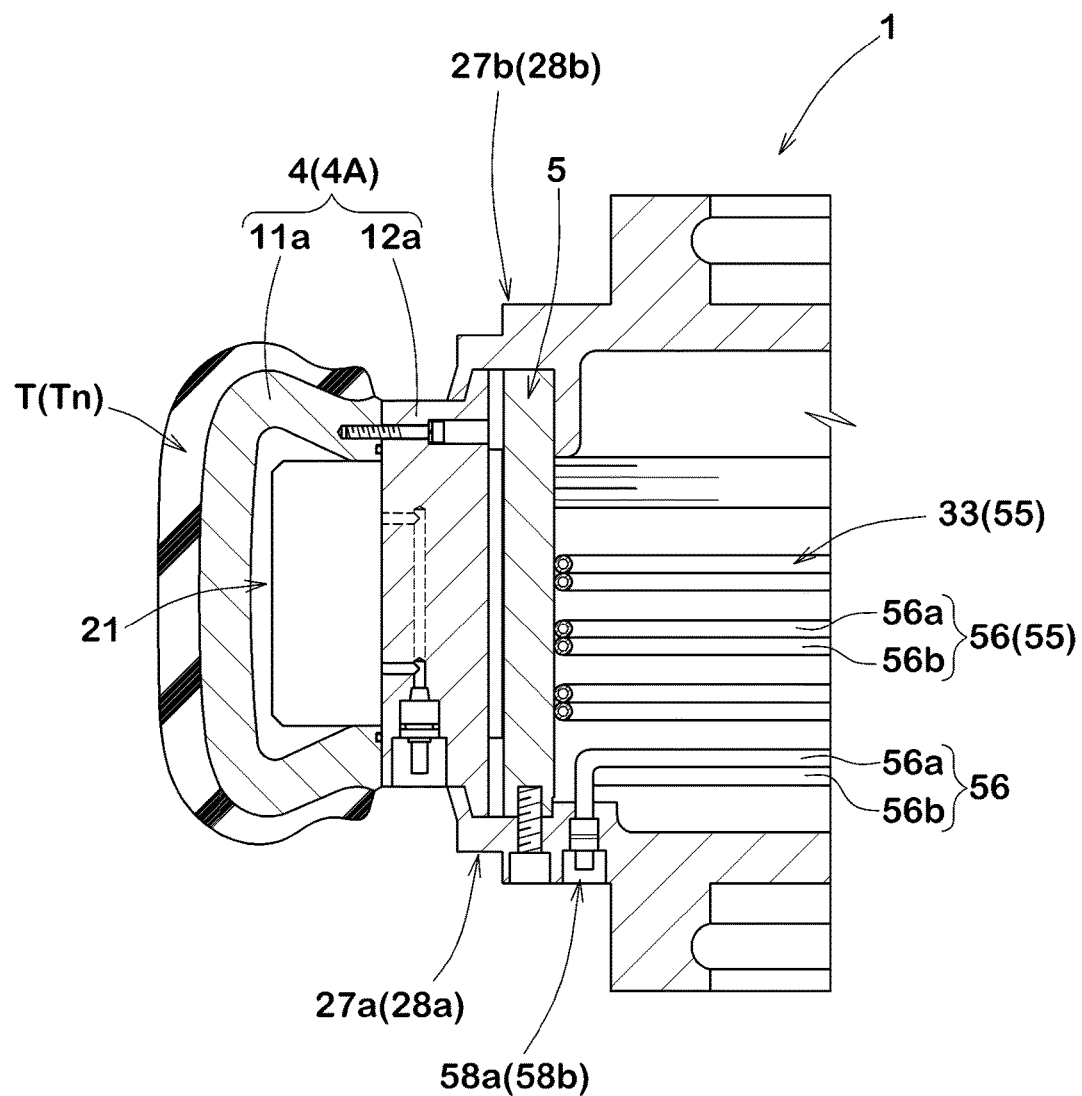
FIG. 12 is a cross-sectional view showing an outer diameter adjustment means of another embodiment of the present invention.

In the previous embodiments described above, the outer diameter adjusting means 33 was exemplify formed as the heating means 34 (shown in FIG. 1) for heating the core 5, but is nut limited thereto. The outer diameter adjusting means 33 may be, for example, constituted by a cooling means for cooling the core 5. FIG. 12 is a cross-sectional view showing an outer diameter adjusting means according to another embodiment of the present invention.

This cooling means 55 according to this embodiment is disposed on the radially inner circumferential surface of the core 5 and comprises a refrigerant pipe 56 for circulating cold fluid (e.g., water). The refrigerant pipe 56 comprises a first refrigerant pipe 56a for supplying the cold fluid and a second refrigerant pipe 56b for guiding heat exchanged fluid. To the first refrigerant pipe 56a, for example, the cold fluid is supplied from a cold fluid supply apparatus (not shown) through a supply port 58a provided at the first side wall member 27a. To the second refrigerant pipe 56b, the heat exchange fluid is collected through an outlet 58b provided at the first side wall member 27a.

This cooling means 55 circulates the cold fluid on the inner surface of the core 5, thereby cooling the core 5 effectively. Thus, the cooling means 55 decreases the temperature of the core 5, and the core 5 thermally shrinks. Thus, it can reduce the outer diameter D1 (shown in FIG. 3) of the core 5. On the other hand, in the cooling means 55, when stopping the supply of the cold fluid, the temperature of the core 5 increases by the heat transferred from the segment 4, and the core 5 is thermally expanded. Accordingly, the cooling means 55 can enlarge the outer diameter D1 of the core 5, and the gap G (shown in FIG. 6(b)) between the segments 4A and 4B, and the level difference R (shown in FIG. 6(a)) outer surface S between the segments 4A and 4B can be adjusted.

In the previous embodiments, the outer diameter adjusting means 33 comprises only the heating means 34 (shown in FIG. 1) or the cooling means 55 (shown in FIG. 12), for example, but it is desired to comprise both the heating means 34 and the cooling means 55. Thus, since the core 5 is effectively heated and cooled, the outer diameter adjusting means 33 can adjust the outside diameter D1 of the core 5 quickly. Therefore, gap G (shown in FIG. 6(b)) between the segment 4A and 4B and the level difference R (shown in FIG. 6(a)) of the outer surface S between the segments 4A and 4B are rapidly set to the preferred ranges, thereby effectively improving the accuracy of forming the tire T. Incidentally, to the refrigerant pipe 56 shown in FIG. 12, since not only the cold fluid but also thermal fluid are supplied, it can compose both the heating means 34 and the cooling means 55 readily.

The above has described in detail a particularly preferred embodiment of the present invention, the present invention is not limited to the embodiments shown but may be embodied upon modifying the same into various forms.

EXAMPLE

A rigid inner mold having a basic structure shown in FIG. 1 and FIG. 2 and an outer diameter adjusting means was prepared (Example). Then, according to operating procedures shown in FIG. 7, an approximate expression expressing a relationship between a temperature of the core and a gap between segments (as shown in FIG. 8) was determined.

Next, a green tire is formed on an outer surface of the rigid inner mold of Example, and a vulcanization step for vulcanizing the green tire was carried out. In the vulcanization step, based on the approximate expression (shown in FIG. 8) expressing the relationship between the temperature of the core and the gap which was obtained in advance, an adjustment step for adjusting the outer diameter of the core was successively carried out so that the gap between the segments was not more than 0.04 mm. After the vulcanization, the tire and the rigid inner mold were removed from the vulcanization mold. By being taken out the rigid inner mold from the lumen of the tire, the tire was manufactured.

Then, on the inner surface of the tire of Example, a presence or an absence of spew was confirmed visually. In addition, by use of a tire uniformity tester, the tire of Example was measured based on the following conditions (rim, internal pressure, load and speed) from OA of RFV (radial force variation) and from the first RFV to the fifth REV. The common specifications are as follows.

Inner mold body:
  First segment: five (5)
  Second segment: five (5)
Tire size: 195/65R15
Rim: 6.0 J×15
Internal pressure: 200 kPa
Load: 4630 N
Speed: 120 km/h
Tire uniformity tester (manufactured by KOKUSAI CO., LTD.):
  Drive: drum
  Detection: tire axis
  Load cell: Piezoelectric element (manufactured by Kistler Co., Ltd.)
  Drum diameter: 2000 mm
  Drum width: 400 mm
  Surface material: Safety-walk From the test result, no spew was formed on the inner surface of the tire of Example. The RFV of the tires of Example were as follows. The tire of Example could make the OA of RFV and the fifth RFV small. Thus, the method of Example could improve a high accuracy of forming tire while reduce the while reducing forming the spew.

RFV (OA): 127 N
RFV ($1^{st}$): 30 N
RFV ($2^{nd}$): 13 N
RFV ($3^{rd}$): 9 N
RFV ($4^{th}$): 15 N
RFV ($5^{th}$): 38 N

Further, in the manufacturing method of Example, a gap and a level difference between the segments could be flexibly adjusted by an outer diameter adjusting means. Thus, for example, even if a spew was formed on a tire in the first manufacture due to a manufacturing error of the inner mold body or even if uniformity was lowered, the accuracy of forming an upcoming tire to be manufactured could be reliably increased by being suitably corrected by the outer diameter adjusting means.

The invention claimed is:

1. A tire manufacturing method for vulcanizing a green tire using a rigid inner mold comprising an outer surface for molding an inner cavity surface of a pneumatic tire, the method comprising:
   a step of forming the green tire on the outer surface of the rigid inner mold; and a vulcanization step of vulcanizing the green tire on the rigid inner mold, wherein the rigid inner mold comprises:
- an inner mold body comprising a plurality of segments forming an annular shape with a central hole upon being assembled,
- a core disposed in the central hole and substantially constraining the respective segments to hold the inner mold body in the annular shape, and
- an outer diameter adjusting means for changing an outer diameter of the core by changing a temperature of the core such that the respective segments move outward in a radial direction of the tire to increase a gap between adjacent segments by an expansion of the outer diameter of the core, and the respective segments move inward in the radial direction of the tire to increase a level difference of outer surfaces between adjacent segments by a reduction of the outer diameter of the core, wherein the vulcanization step comprises an adjustment step of adjusting the outer diameter of the core by the outer diameter adjusting means so that the gap and the level difference fall within predetermined ranges, wherein prior to the adjustment step, the tire manufacturing method further comprises a preparation step of preliminarily obtaining a relationship between the temperature of the core and the gap or level difference, and the adjustment step regulates the temperature of the core based on the relationship.

2. The tire manufacturing method as set forth in claim 1, wherein the preparation step comprises:
- a step of measuring the gap or level difference with respect to each temperature by changing the temperature of the core, and
- a step of determining an approximate expression indicating the relationship based on the gap or level difference measured with respect to each temperature.

3. The tire manufacturing method as set forth in claim 1, wherein the preparation step comprises:
- a step of defining a plurality of segment models on a computer in which the respective segments are discretized using a finite number of elements,
- a step of defining a core model on the computer in which the core is discretized using the finite number of elements,
- a step of calculating where the computer calculates the gap or level difference as a gap or level difference between segment models by changing a temperature of the core model, and
- a step of determining where the computer determines the approximate expression indicating the relationship based on a calculation result of the gap or level difference between segment models.

4. The tire manufacturing method as set forth in claim 1, wherein the adjustment step adjusts the gap in a range of more than 0 mm and not more than 0.04 mm.

5. The tire manufacturing method as set forth in claim 2, wherein the adjustment step adjusts the gap in a range of more than 0 mm and not more than 0.04 mm.

6. The tire manufacturing method as set forth in claim 3, wherein the adjustment step adjusts the gap in a range of more than 0 mm and not more than 0.04 mm.

* * * * *